US012759507B2

(12) United States Patent
Chang et al.

(10) Patent No.: US 12,759,507 B2
(45) Date of Patent: Oct. 13, 2026

(54) UNIVERSAL CONNECTING STRUCTURE

(71) Applicant: DANYANG UPC AUTO PARTS CO., LTD., Danyang (CN)

(72) Inventors: Che-Wei Chang, Danyang (CN); Cheng-Kai Yang, Danyang (CN); Chuan-Chih Chang, Danyang (CN)

(73) Assignee: DANYANG UPC AUTO PARTS CO., LTD., Zhenjiang (CN)

( * ) Notice: Subject to any disclaimer, the term of this patent is extended or adjusted under 35 U.S.C. 154(b) by 295 days.

(21) Appl. No.: 18/609,199

(22) Filed: Mar. 19, 2024

(65) Prior Publication Data

US 2025/0296533 A1 Sep. 25, 2025

(51) Int. Cl.
*B60S 1/40* (2006.01)

(52) U.S. Cl.
CPC ........... *B60S 1/4003* (2013.01); *B60S 1/4067* (2013.01)

(58) Field of Classification Search
CPC ........ B60S 1/40; B60S 1/4003; B60S 1/4067; B60S 1/4083
USPC .......................................... 15/250.31, 250.32
See application file for complete search history.

(56) References Cited

U.S. PATENT DOCUMENTS

| | | | | |
|---|---|---|---|---|
| 8,601,636 B2 * | 12/2013 | Yang | B60S 1/4074 | 15/250.32 |
| 8,650,701 B2 * | 2/2014 | Yang | B60S 1/4048 | 15/250.32 |
| 10,513,246 B2 * | 12/2019 | Kawashima | B60S 1/4048 | |
| 11,040,705 B2 * | 6/2021 | Kawashima | B60S 1/4041 | |
| 11,618,415 B1 * | 4/2023 | Chang | B60S 1/38 | 15/250.31 |
| 2012/0144615 A1 * | 6/2012 | Song | B60S 1/4048 | 15/250.32 |
| 2015/0089766 A1 * | 4/2015 | Caillot | B60S 1/3849 | 15/250.32 |
| 2016/0107615 A1 * | 4/2016 | Young, III | B60S 1/387 | 15/250.32 |
| 2017/0197592 A1 * | 7/2017 | Friscioni | B60S 1/387 | |

* cited by examiner

*Primary Examiner* — David J Parsley
(74) *Attorney, Agent, or Firm* — HDLS IPR SERVICES; Chun-Ming Shih

(57) ABSTRACT

A universal connecting structure which is used to make a windshield wiper blade be connected to a windshield wiper arm having different specifications and includes a main body having an end cover and a bar-shaped block extended from the end cover. The bar-shaped block has a pivotal groove to make the windshield wiper blade be connected, a latching block used to latch the windshield wiper arm is disposed on the bar-shaped block away from the end cover, a pivotal connecting hole allowing the windshield wiper arm to pass is formed on the bar-shaped block close to be end cover, one end of the bar-shaped block is formed with an engaging hole, a positioning hook is disposed at a top end of the engaging hole, and two sides of the bar-shaped block are respectively formed with a guiding strip and a buckling slot.

1 Claim, 14 Drawing Sheets

UNIVERSAL CONNECTING STRUCTURE

BACKGROUND OF THE DISCLOSURE

Technical Field

The present disclosure relates to a windshield wiper technology, especially to a universal connecting structure.

Description of Related Art

There are many different types of transportation vehicles, and a windshield wiper is adopted no matter in a private vehicle or a mass transportation vehicle. A power-driven windshield wiper blade is disposed at a front side of a windshield glass, and the windshield wiper is used to wipe off rainwater, snow or debris on the wind shield glass when being operated.

A related-art windshield wiper mainly includes a windshield wiper arm, a windshield wiper blade and a connecting structure. The connecting structure is used to connect the windshield wiper arm and the windshield wiper blade. The windshield wiper blade is a consuming component, thus the windshield wiper blade is required to be replaced due to being deteriorated, broken or uneven at the edge thereof after being operated for a period of time. The related-art windshield wiper blade is sold as a modular unit, and there is no replaceable option between different specifications, thus a consumer faces a problem when the consumer wants to replace the windshield wiper blade.

Accordingly, the applicant of the present invention has devoted himself for improving the mentioned disadvantages.

SUMMARY OF THE DISCLOSURE

The present disclosure is to provide a universal connecting structure, which has an advantage of allowing two windshield wiper blades be disposed on windshield wiper arms having different specifications.

Accordingly, the present disclosure provides a universal connecting structure which is used to make a windshield wiper blade be connected to a windshield wiper arm having different specifications and includes a main body having an end cover and a bar-shaped block extended from the end cover, one end of the end cover close to the bar-shaped block has a pressing plate pressing the windshield wiper arm, the bar-shaped block has a pivotal groove to make the windshield wiper blade be connected, a latching block used to latch and fasten the windshield wiper arm is disposed at a location of the bar-shaped block away from the end cover, a pivotal connecting hole allowing the windshield wiper arm to pass is formed at a location of the bar-shaped block close to be end cover, one end of the bar-shaped block away from the end cover is formed with an engaging hole, a positioning hook is disposed at a top end of the engaging hole of the bar-shaped block, and two sides of the bar-shaped block are respectively formed with a guiding strip and a buckling slot.

In comparison with related art, the present disclosure has advantageous features as follows. With a supplemental unit, various corresponding assembly features are provided with respect to different types of the windshield wiper arms, thus the universal connecting structure of the present disclosure is provided with an advantage of being more applicable.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
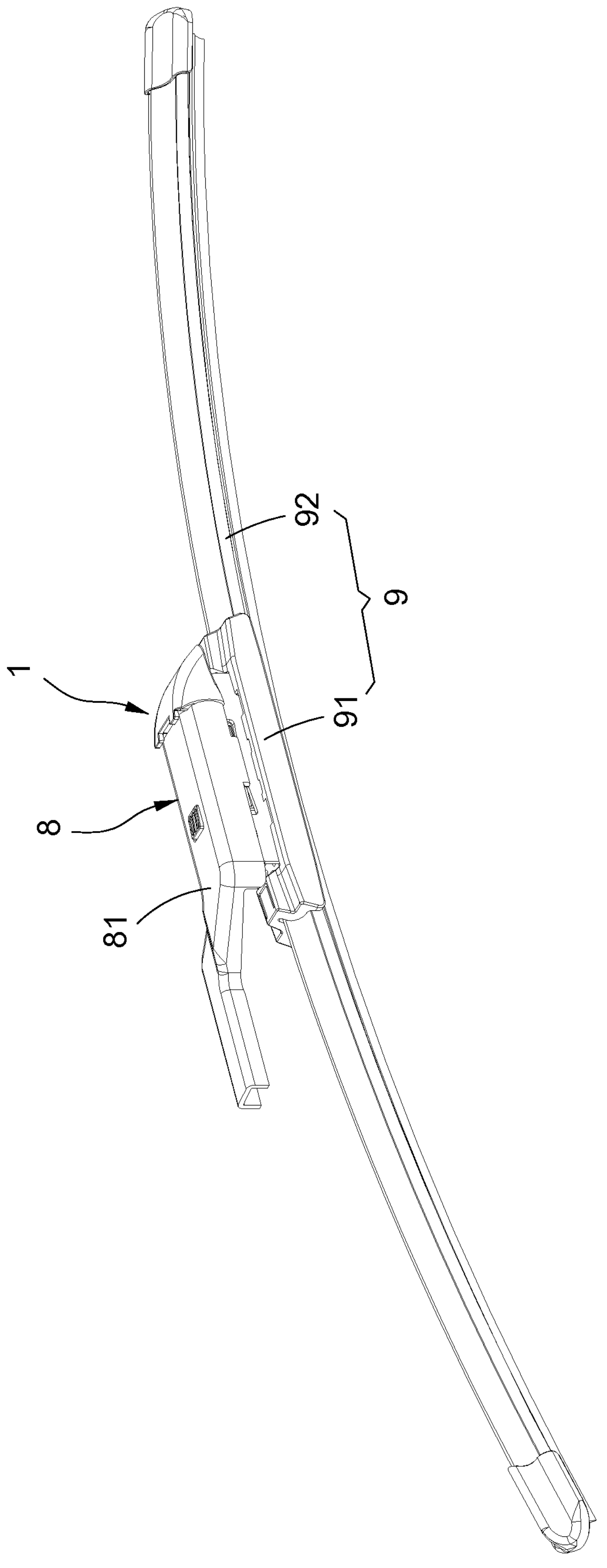
FIG. 1 is a perspective view showing the assembly of the windshield wiper arm and the windshield wiper blade according to the first embodiment of the present disclosure.
Figure 2:
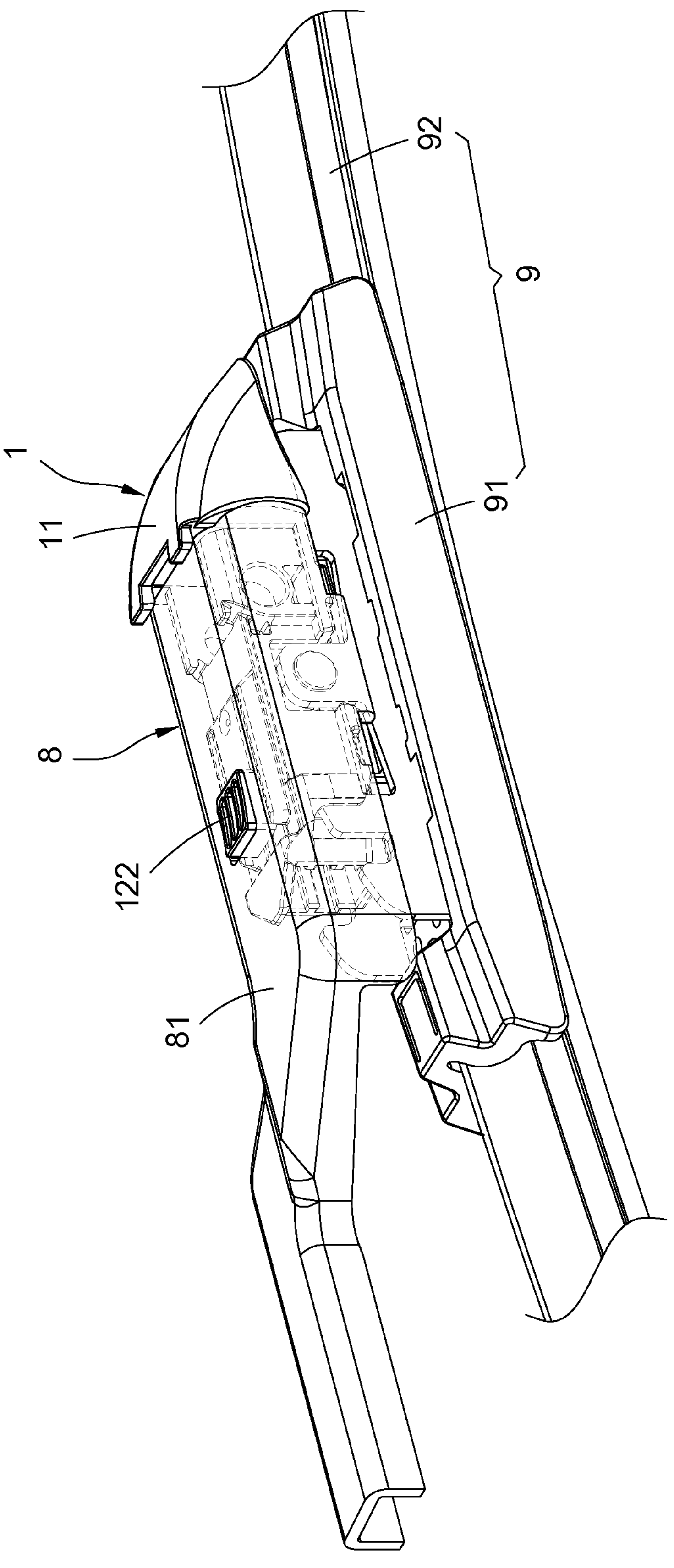
FIG. 2 is a partially enlarged perspective view of FIG. 1.
Figure 3:
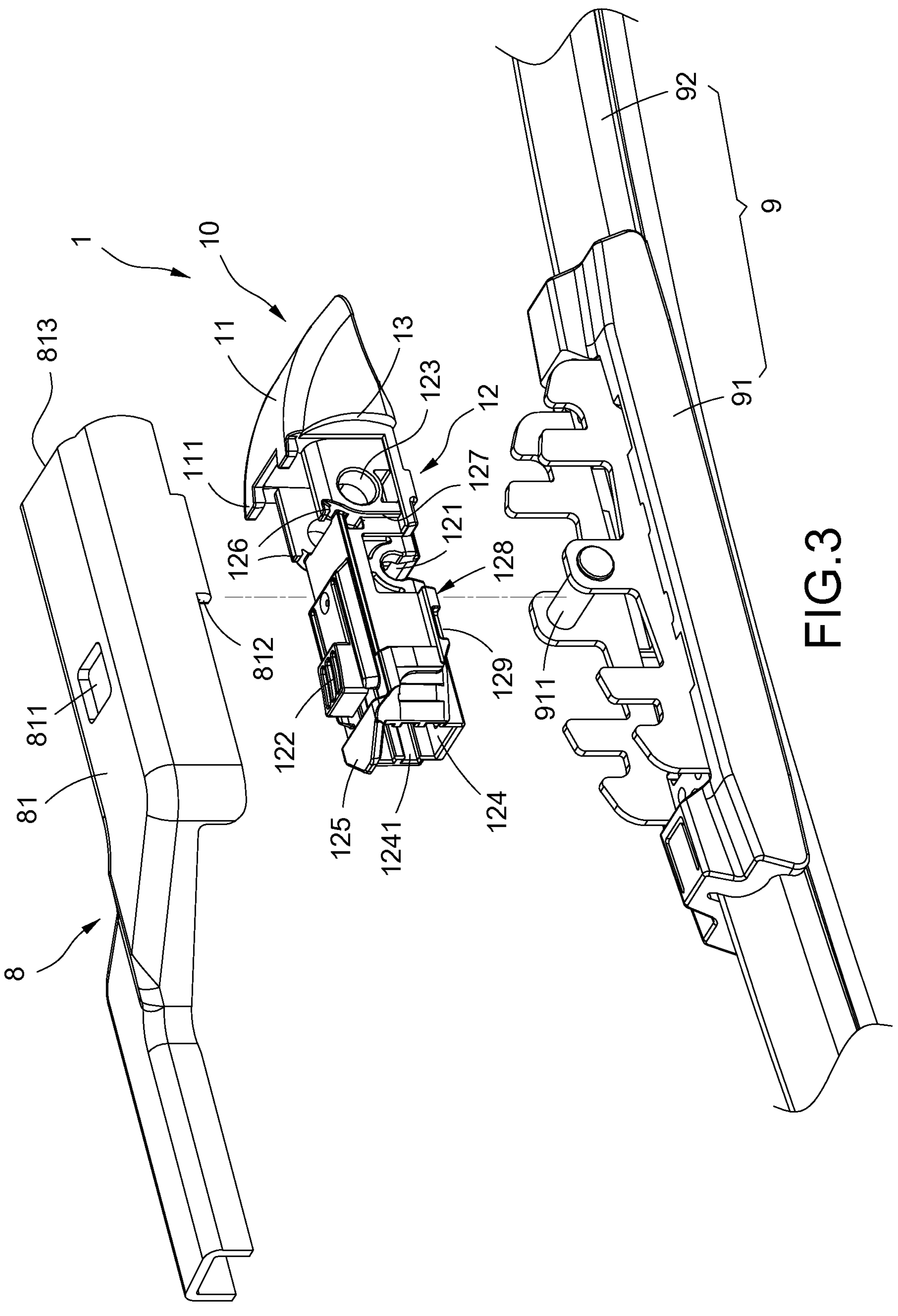
FIG. 3 is an exploded view of FIG. 2.

Please refer from FIG. 1 to FIG. 3, the present disclosure provides a universal connecting structure, which is used to make a windshield wiper blade 9 be connected to one of the windshield wiper arms 8 having different specifications. In this embodiment, the windshield wiper arm 8 mainly includes a cover member 81, a cross section of the cover member 81 is substantially formed in a U shape. A middle position at a closed end of the cover member 81 is formed with a latching slot 811, and a middle position at an open end thereof is disposed with a pair of buckling hooks 812 correspondingly arranged. One end of the cover member 81 away from the latching slot 811 is formed with an abutting surface 813. The windshield wiper blade 9 mainly includes a seat member 91 and a scrapping blade 92. The seat member 91 is clamped and fastened at a middle portion of the scrapping blade 92, and a middle position of the seat member 91 is disposed with a pivotal shaft 911.

In this embodiment, the universal connecting structure 1 mainly includes a main body 10 having an end cover 11 and a bar-shaped block 12. The end cover 11 is substantially formed in a fan shape, and two pressing plates 111 are extended from a top end of the end cover 11. The bar-shaped block 12 is subsequently formed as a rectangular member, and the bar-shaped block 12 is extended from one end of the end cover 11. A stopping wall 13 is disposed between the end cover 11 and the bar-shaped block 12. A pivotal slot 121 is formed at a bottom end of the bar-shaped block 12, and the pivotal slot 121 is used to make the pivotal shaft 911 of the windshield wiper 9 be disposed and connected. A latching block 122 is formed at a top end of the bar-shaped block 12 and used to make the latching slot 811 of the cover member 81 of the windshield wiper arm 8 be correspondingly latched and fastened. The bar-shaped block 12 is further formed with a pivotal connecting hole 123 at a location close to the end cover 11. The bar-shaped block 12 is further formed with an engaging hole 124 at a location away from a distal surface of the end cover 11. The bar-shaped block 12 is disposed with a positioning hook 126 located above the pivotal connecting hole 123. Two sides of the bar-shaped block 12 are respectively disposed with a guiding strip 128 and a buckling slot 129. Each of the guiding strips 128 is extended from the end cover 11 to a distal end of the bar-shaped block 12. The buckling slot 129 is disposed below the guiding strip 128. The pivotal connecting hole 123 and the engaging hole 124 are used to make windshield wiper arms having different specifications be adopted.

When being assembled, the pivotal slot 121 of the main body 11 is correspondingly sheathed with the pivotal shaft 911 of the seat member 91 of the windshield wiper blade 9. And then, the bar-shaped block 12 is inserted in the cover member 81 of the windshield wiper arm 8. The main body 10 and the cover member 81 are combined by each of the guiding strips 128 and each of the buckling hooks 812 being connected with a sliding manner, thus the cover member 8 is prevented from generating a top/down movement. When the latching block 122 reaches the location of the latching slot 811 of the cover member 81, the latching block 122 is latched in the latching slot 811 to be positioned via an elastic action force of the latching block 122, at this moment the abutting surface 813 of the cover member 81 abuts against the stopping wall 13, each of the pressing plates 111 presses at the top end of the cover member 81, and each of the buckling hooks 812 is latched at a middle portion defined at a bottom edge of each of the guiding strips 128, thus a stable fastening structure is established.

Figure 4:
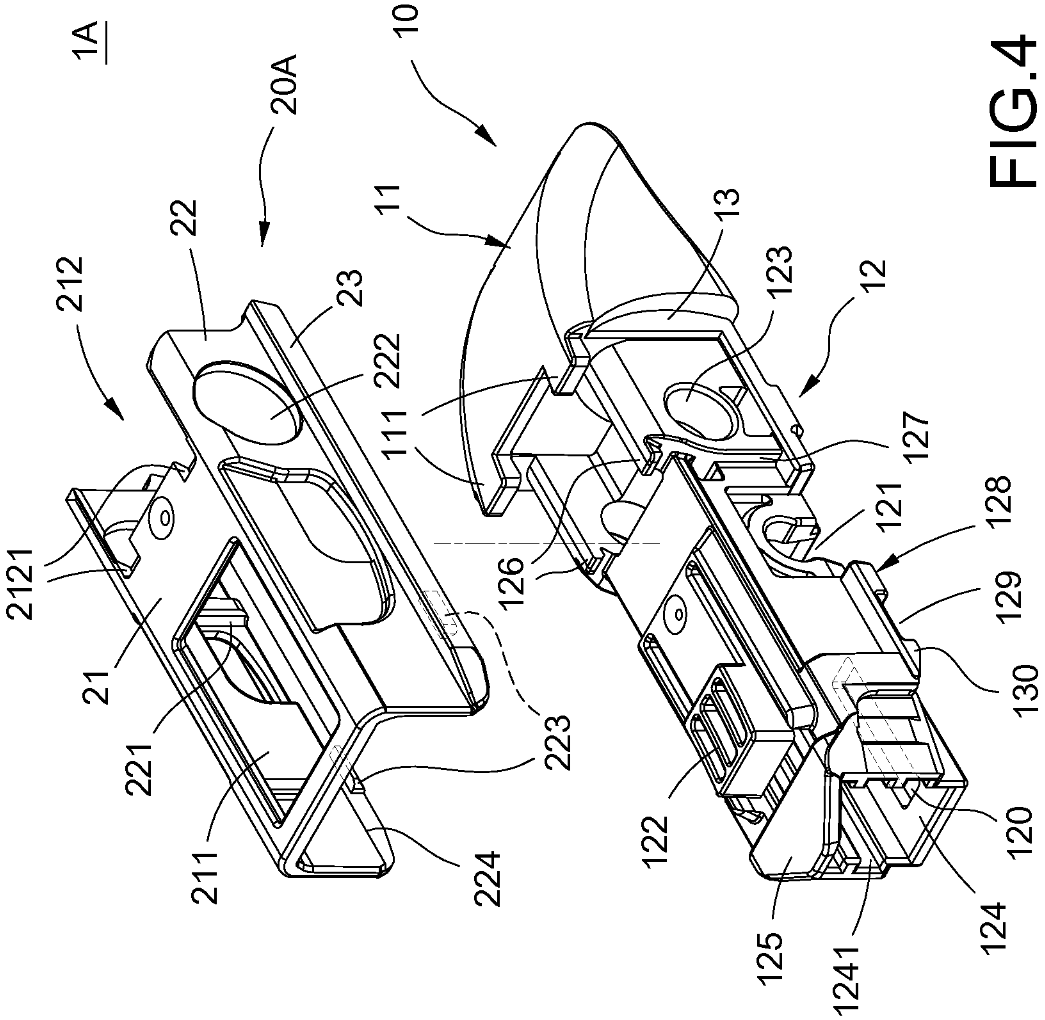
FIG. 4 is an exploded view according to the second embodiment of the present disclosure.
Figure 5:
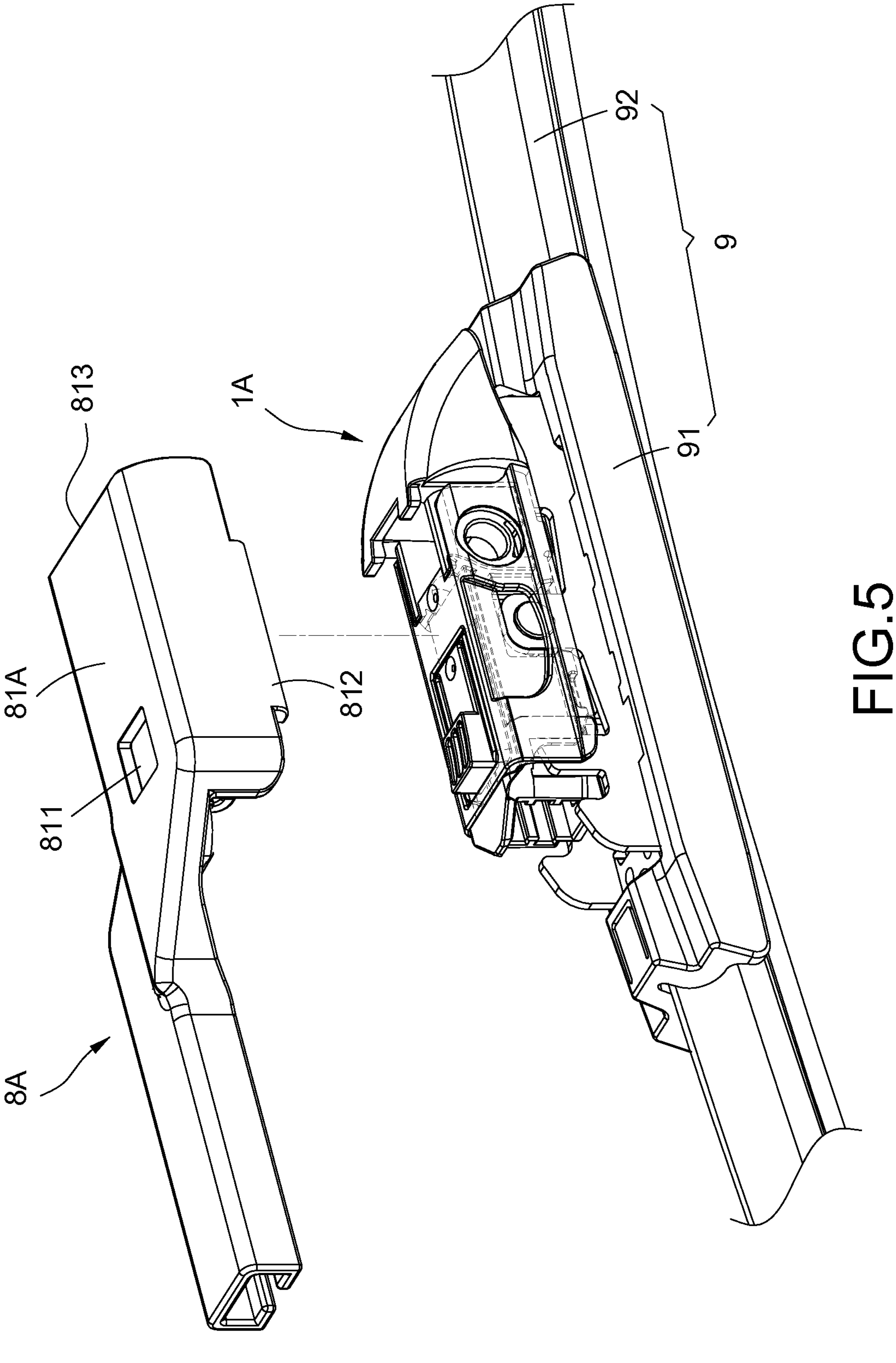
FIG. 5 is a schematic view showing the connecting structure of the windshield wiper arm being connected to the windshield wiper blade of FIG. 4.
Figure 6:
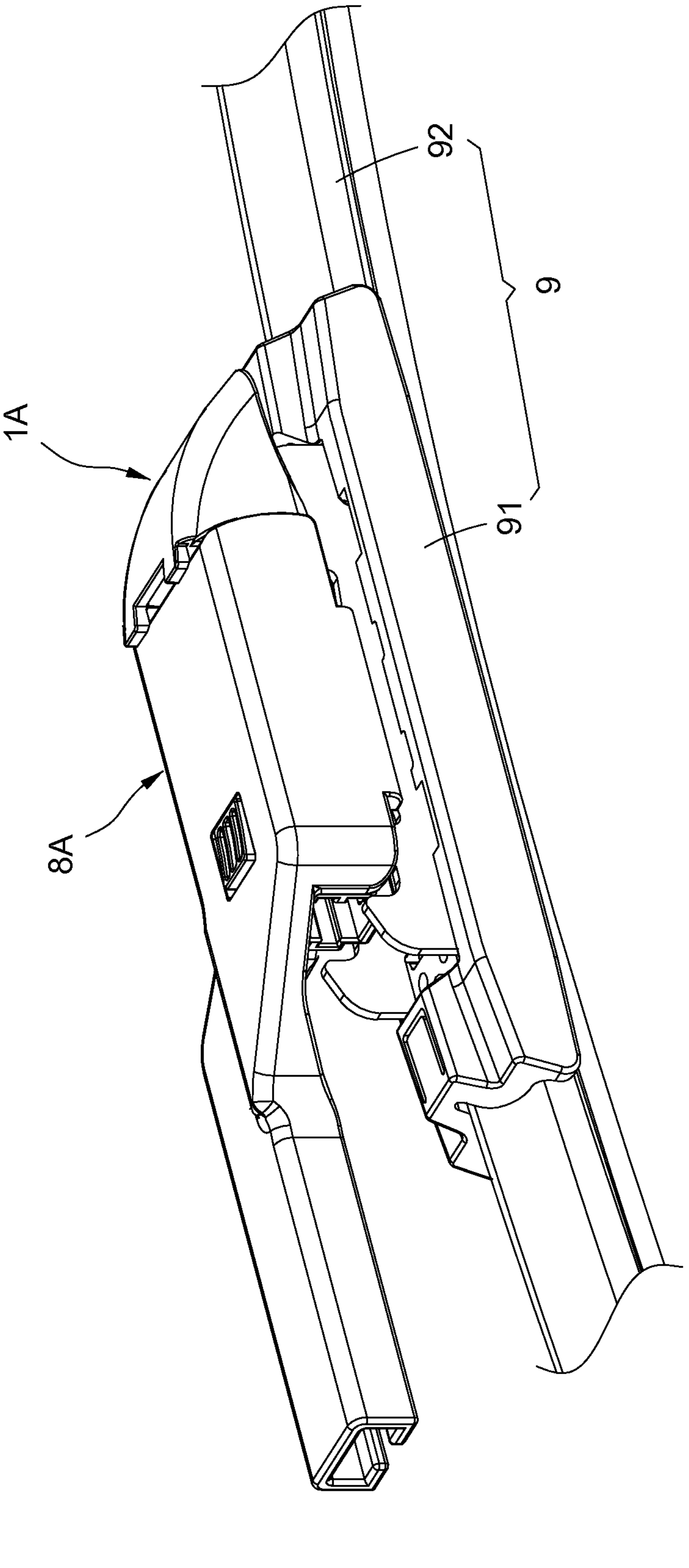
FIG. 6 is a perspective view showing the assembly of FIG. 5.

Please refer from FIG. 4 to FIG. 6, a universal connecting structure 1A is disclosed in this embodiment. The universal connecting structure 1A further includes a supplemental unit 20A. The supplemental unit 20A is coupled with the main body 10 in a replaceable manner, thus the main body 10 is connected to a windshield wiper arm 8A having another specification via the supplemental unit 20A. An inner width of a cover member 81A of the windshield wiper arm 8A is wider than an inner width of the cover member 81 of the windshield wiper arm 8.

In this embodiment, the supplemental unit 20A mainly includes a top plate 21, two side plates 22 downwardly extended from the top plate 21 and a guiding rail 23 extended from each of the side plates 22. The top plate 21 has an accommodation slot 211 and a notch 212. Two positioning slots 2121 are formed at an inner side of the notch 212 of the top plate 21. Each of the positioning slots 2121 is arranged corresponding to each of the positioning slots 126 to be mutually engaged and positioned. The accommodation slot 211 is arranged corresponding to the latching block 122 to make the latching block 122 be protruded from the accommodation slot 211 and out of the top plate 21. The guiding rail 23 is arranged corresponding to each of the buckling hooks 812 of the cover member 81A, thus the supplemental unit 20A and the windshield wiper arm 8A are connected with a sliding manner. A blocking side 127 is respectively formed at the bottom end of each of the positioning hooks 126. An inner side of each of the side plates 22 is disposed with a blocking strip 221 corresponding to each of the blocking side 127 to form an effect of mutually blocking and positioning. A convex protrusion 223 is respectively extended from an inner bottom side of each of the side plates 22. Each of the convex protrusions 223 is correspondingly buckled and fastened with each of the buckling slots 129. A latching hook 130 is respectively disposed at a rear side of each of the buckling slots 129 of the bar-shaped block 12. A latching plate 224 is respectively disposed at a rear side of the convex protrusion 223 of each of the side plates 22. Each of the latching plates 224 is correspondingly latched and fastened with each of the latching hooks 130.

When being assembled, the supplemental unit 20A is correspondingly connected to the main body 10. Each of the positioning hooks 126 of the main body 10 is correspondingly positioned in each of the positioning slots 2121 of the notch 212 of the supplemental unit 20A. The latching block 122 protrudes from the accommodation slot 211. Each of the convex protrusions 233 is correspondingly buckled and fastened with each of the buckling slots 129. Each of the latching plates 224 is correspondingly latched and fastened with each of the latching hooks 130. The pivotal slot 121 of the main body 10 is correspondingly sheathed with the pivotal shaft 911 of the windshield wiper blade 9. The bar-shaped block 12 having the supplemental unit 20A is inserted in the cover member 81A of the windshield wiper arm 8A, at this moment each of the guiding rails 23 and each of the buckling hooks 812 of the cover member 81A are connected with a sliding manner. When the latching block 122 reaches the location of the latching slot 811, the latching block 122 is latched in the latching slot 811 to be positioned via the elastic action force of the latching block 122, at this moment the abutting surface 813 of the cover member 81A abuts against the stopping wall 13, and each of the pressing plates 111 presses at the top end of the cover member 81A.

Figure 7:
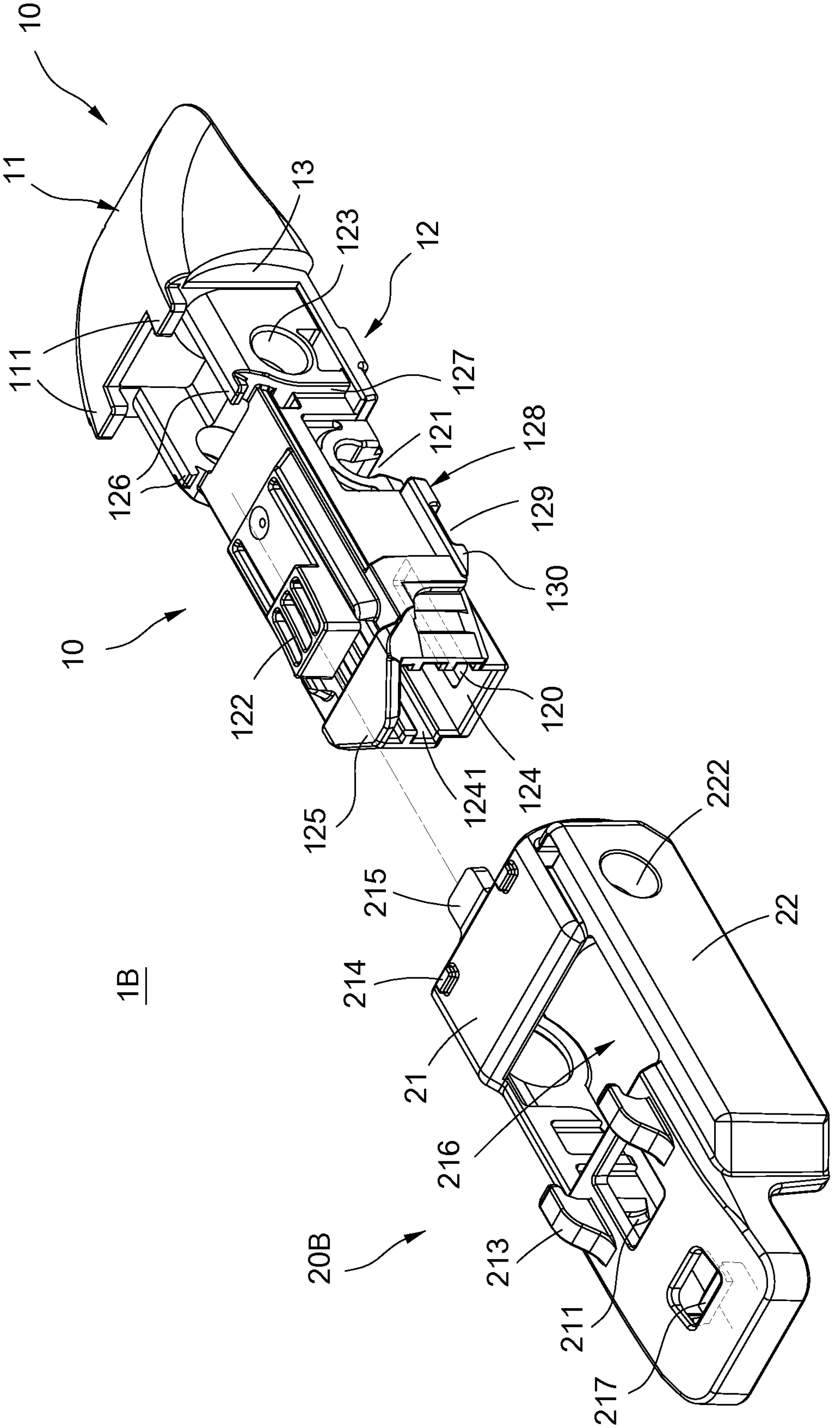
FIG. 7 is an exploded view according to the third embodiment of the present disclosure.
Figure 8:
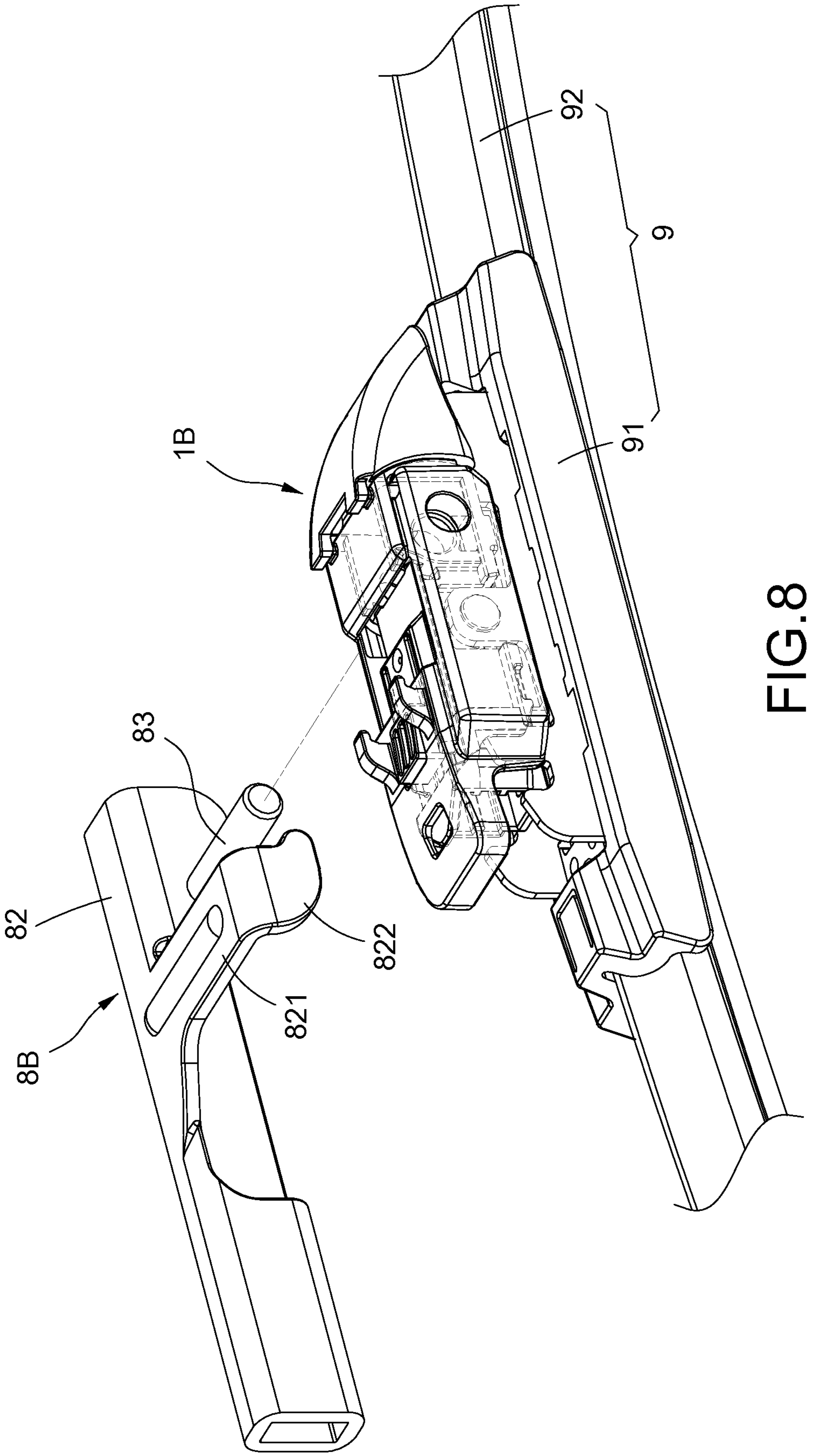
FIG. 8 is a schematic view showing the connecting structure of the windshield wiper arm being connected to the windshield wiper blade of FIG. 7.
Figure 9:
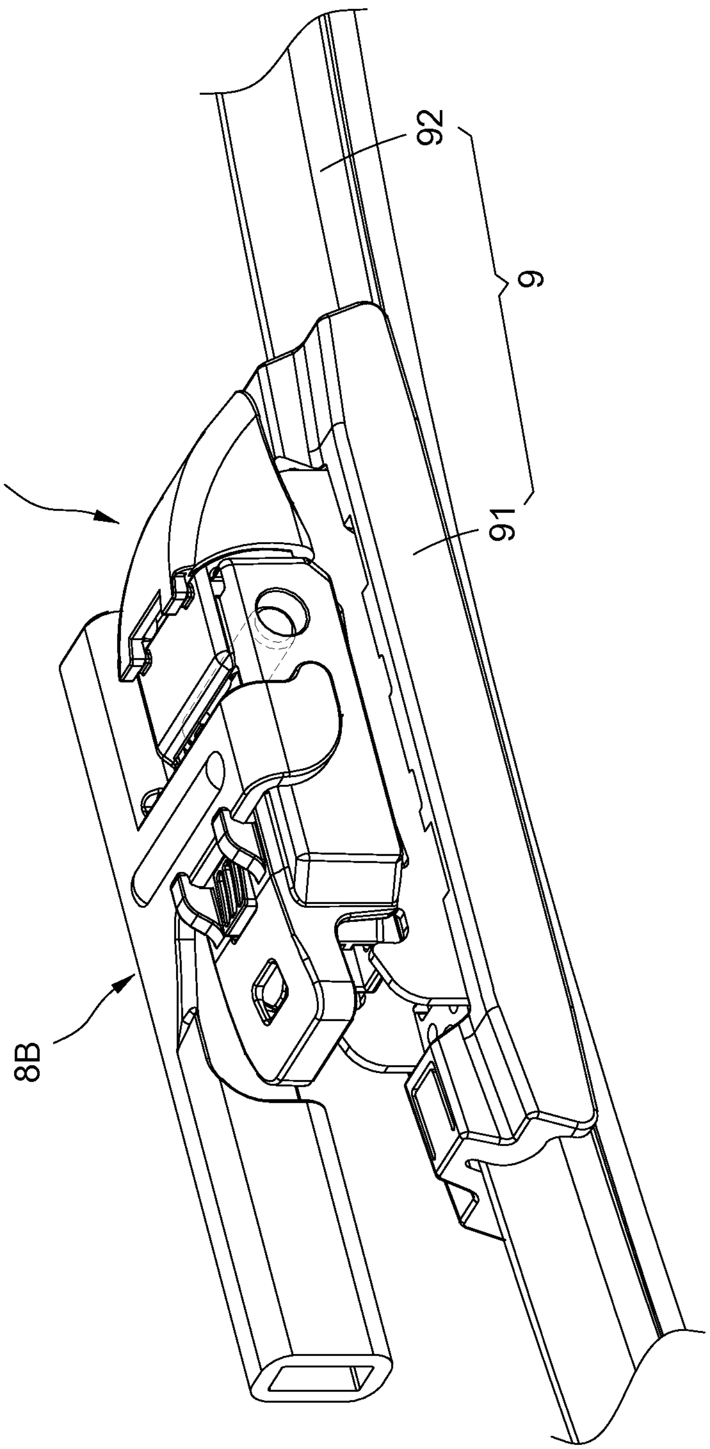
FIG. 9 is a perspective view showing the assembly of FIG. 8.

Please refer from FIG. 7 to FIG. 9, the differences between a universal connecting structure 1B disclosed in this embodiment and the aforesaid embodiments are as follows. A supplemental unit 20B disclosed in this embodiment mainly includes the aforesaid top plate 21 and the aforesaid two side plates 22 downwardly extended from the top plate 21. The top plate 21 has the aforesaid accommodation slot 211 and a latching arm 213 respectively protruded from two sides of the accommodation slot 211. The accommodation slot 211 is disposed corresponding to the aforesaid latching block 122 to make the latching block 122 be protruded from the accommodation slot 211 and out of the top plate 21. Each of the side plates 22 is formed with a communicating hole 222 corresponding to the aforesaid pivotal connecting hole 123. The top plate 21 is respectively disposed with a protruding block 214 at a location close to each of the pressing plates 111 of the aforesaid end cover 11. Each of the protruding blocks 214 is arranged corresponding to each of the pressing plates 111 so as to be pressed and connected. An abutting block 215 is disposed at a front distal surface of the top plate 21 and the abutting block 215 abuts against the aforesaid stopping wall 13. Moreover, a through slot 216 is disposed between the accommodation slot 211 of the top plate 21 and each of the protruding blocks 214. A buckling plate 125 is extended from the top end of the engaging hole 124 of the bar-shaped block 12, and a buckled plate 217 is disposed at one end of the top plate 21 away from the accommodation slot 211. The buckled plate 217 is used to make the buckling plate 125 be buckled and connected.

In this embodiment, a windshield wiper arm 8B mainly includes a rod member 82 and an inserting pin 83 connected to the rod member 82. The rod member 82 is extended with an arm part 821 at a location close to the inserting pin 83, and a distal end of the arm part 821 is disposed with a bending hook 822.

When being assembled, the supplemental unit 20B is correspondingly connected to the main body 10. The latching block 122 of the main body 10 protrudes from the accommodation slot 211. The communicating hole 222 is arranged with a manner of being aligned with the pivotal connecting hole 123. Each of the pressing plates 111 correspondingly presses each of the protruding blocks 214. The buckling plate 125 is buckled and connected at the top end of the buckled plate 217. The pivotal slot 121 of the main body 10 is correspondingly sheathed with the pivotal shaft 911 of the windshield wiper blade 9. The pivotal connecting hole 123 of the bar-shaped block 12 having the supplemental unit 20B is correspondingly sheathed with the inserting pin 83. And then, each of the latching arms 213 is latched and fastened at the top end of the arm part 821 by rotating the windshield wiper blade 9, meanwhile the bending hook 822 is clamped at an outer periphery of the side plate 22.

Figure 10:
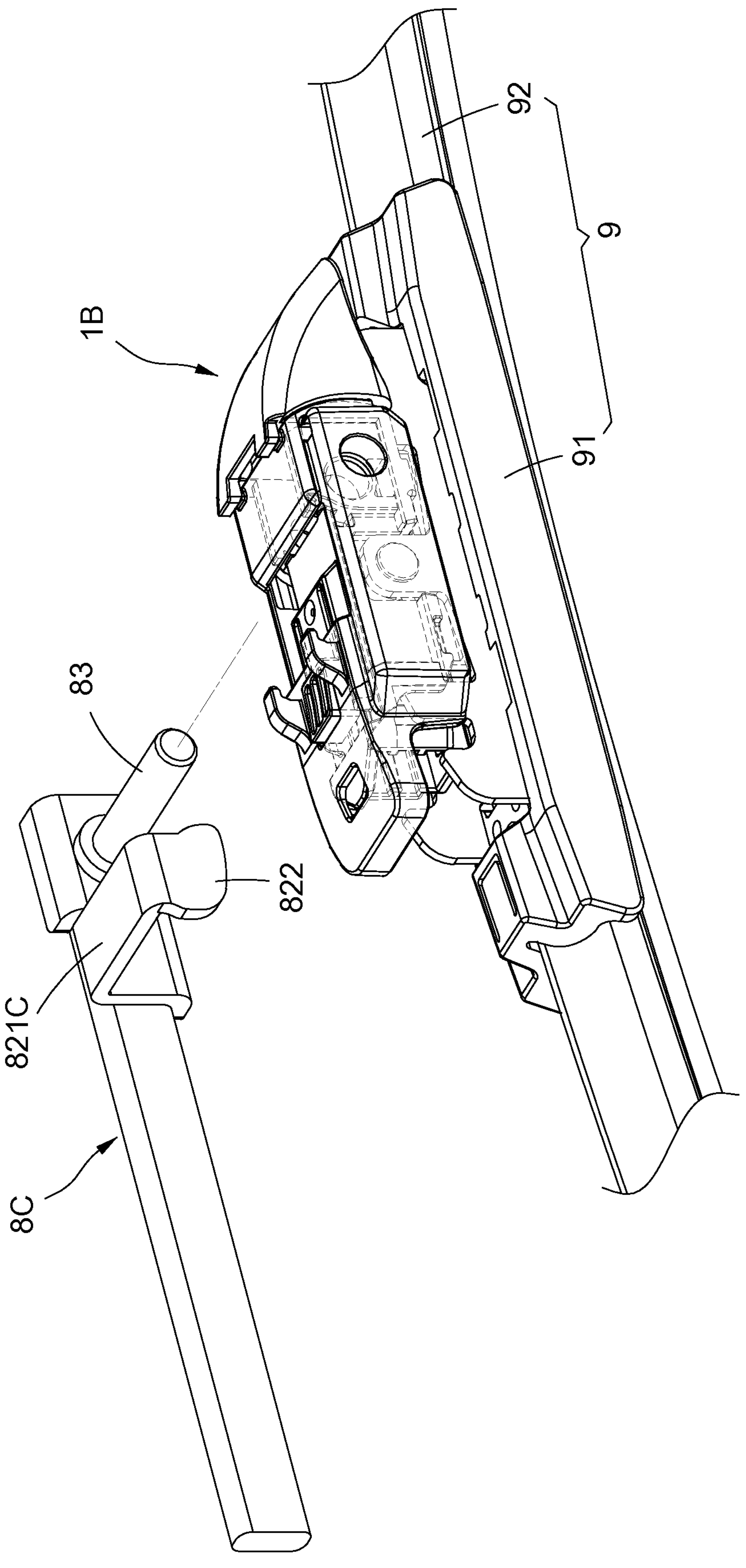
FIG. 10 is a schematic view showing the windshield wiper arm being connected to the windshield wiper blade according to the fourth embodiment of the present disclosure.
Figure 11:
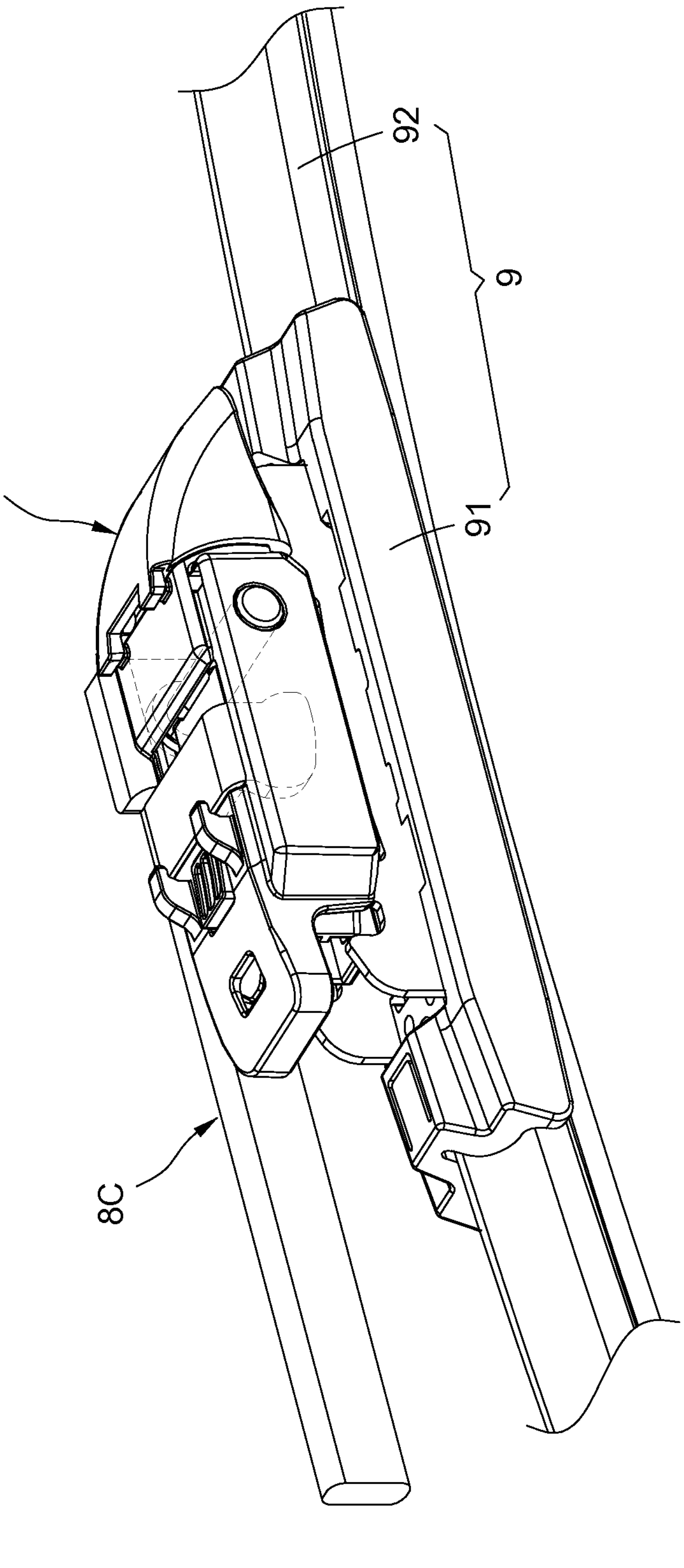
FIG. 11 is a perspective view showing the assembly of FIG. 10.

Please refer to FIG. 10 and FIG. 11 the universal connecting structure 1B disclosed in this embodiment not only allows the aforesaid windshield wiper arm 8B be connected, a windshield wiper arm 8C may also be adopted. In this embodiment, a length of an arm part 821C of the windshield wiper arm 8C is shorter than a length of the arm part 821 of the windshield wiper arm 8B. The assembling method of this embodiment is subsequently the same as the assembling method of the aforesaid embodiments. The difference is that the bending hook 822 is formed in the through slot 216 at the inner side of the side plate 22.

Figure 12:
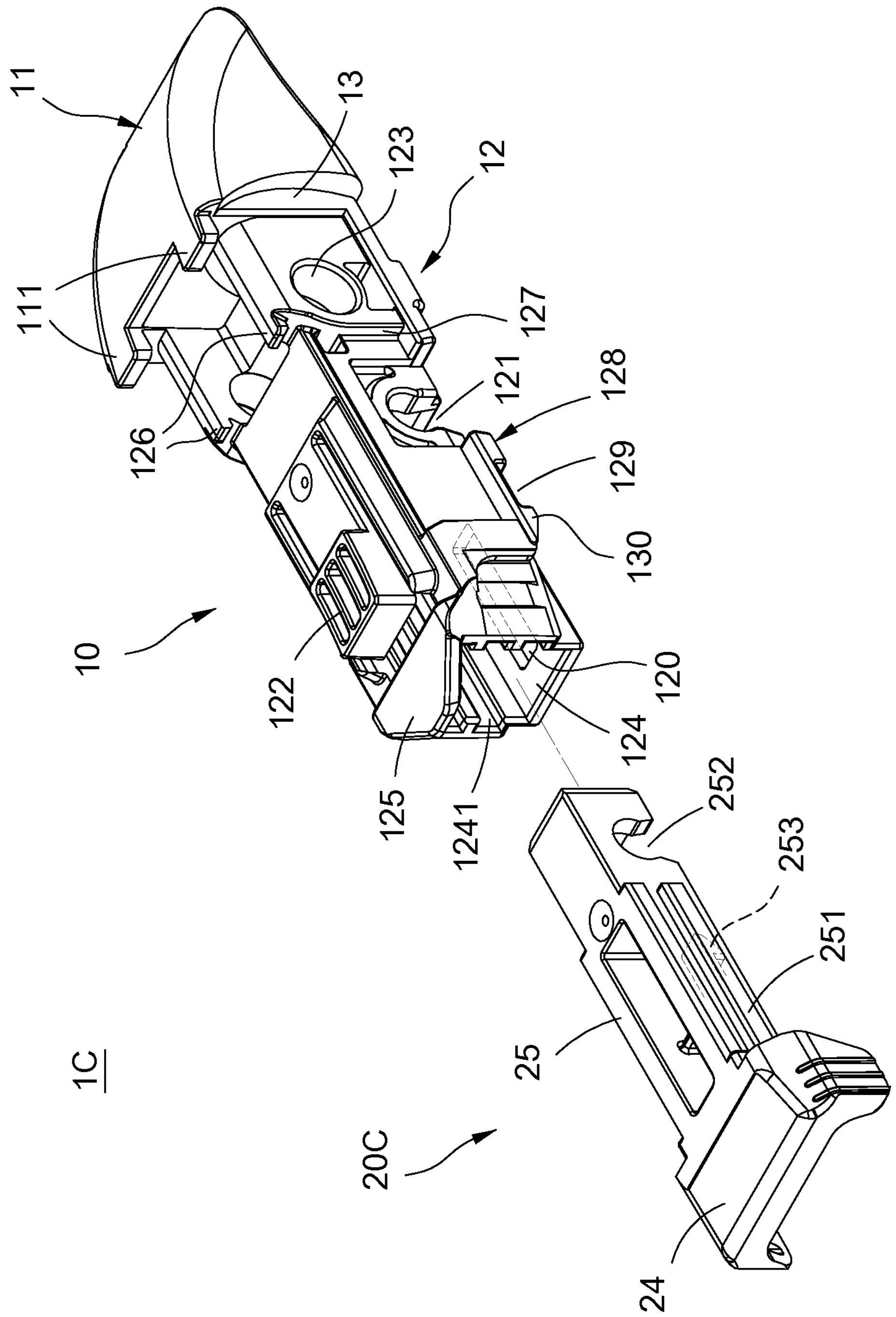
FIG. 12 is an exploded view according to the fifth embodiment of the present disclosure.
Figure 13:
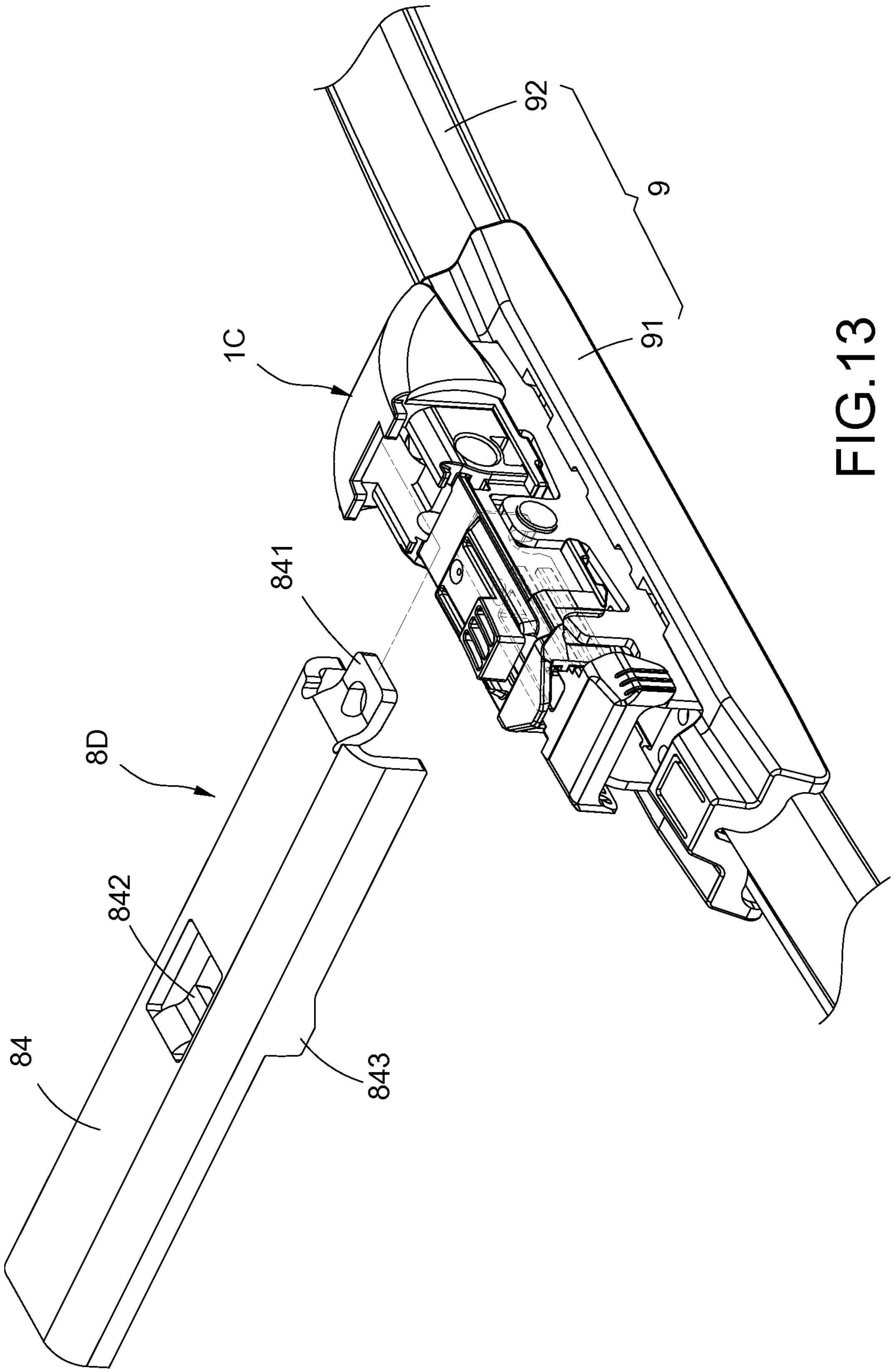
FIG. 13 is a schematic view showing the connecting structure of the windshield wiper arm being connected to the windshield wiper blade of FIG. 12.
Figure 14:
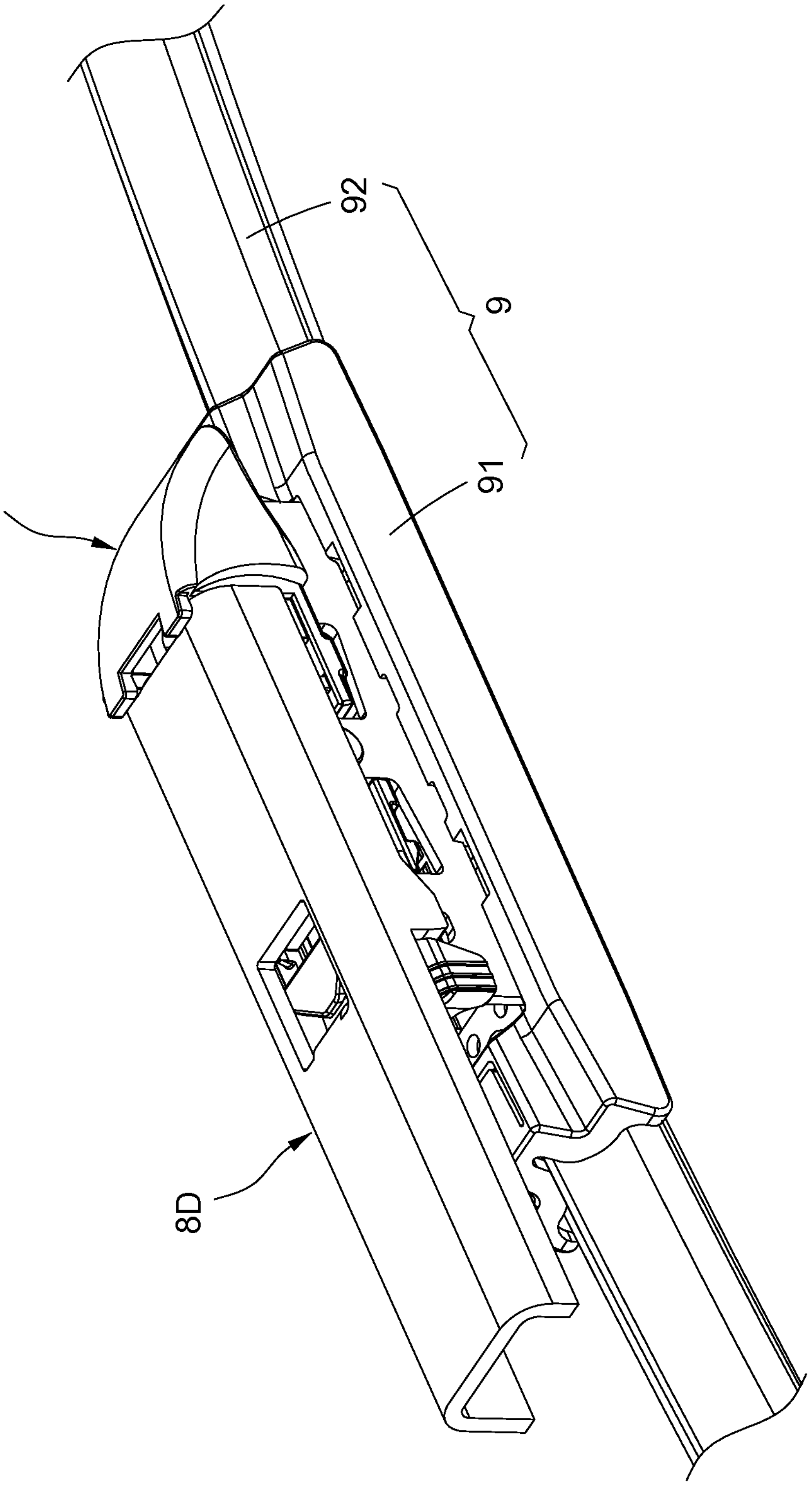
FIG. 14 is a perspective view showing the assembly of FIG. 13.

Please refer from FIG. 12 to FIG. 14, the differences between a universal connecting structure 1C disclosed in this embodiment and the aforesaid embodiments are as follows. A supplemental unit 20C of this embodiment mainly includes a handle part 24 and an inserting block 25 extended from the handle part 24. Two sides of the inserting block 25 are extended with a guiding strip 251. A plurality of guiding slots 1241 are formed on an inner wall of the engaging hole 124 of the bar-shaped block 12. Each of the guiding strips 251 is correspondingly inserted and combined with the guiding slots 1241. One end of the inserting block 25 away from the handle part 24 is disposed with a shaft slot 252. The shaft slot 252 is arranged corresponding to the aforesaid pivotal connecting hole 123. A sliding slot 120 is disposed at the bottom end of the engaging hole 124 of the bar-shaped block 12, a position limiting block 253 is disposed at the bottom end of the inserting block 25, and the position limiting block 253 and the sliding slot 120 are mutually latched and fastened with a sliding manner.

In this embodiment, a windshield wiper arm 8D mainly includes a cover cap 84. The cover cap 84 has a front inserting hook 841, a rear inserting hook 842 and a pair of blocking blocks 843.

When being assembled, the supplemental unit 20C is correspondingly connected to the main body 10. The inserting block 25 is inserted in the engaging hole 124. When the shaft slot 252 reaches the location of the pivotal connecting hole 123 by each of the guiding strips 251 and each of the guiding slots 1241 being attached with a sliding manner, the handle part 24 is limited at an outer side of the bar-shaped block 12, and the position limiting block 253 is mounted in the sliding slot 120 to be positioned. The pivotal slot 121 of the main body 10 and the shaft slot 252 of the inserting block 25 are correspondingly sheathed with the pivotal shaft 911 of the windshield wiper blade 9. The bar-shaped block 12 having the supplemental unit 20C is moved towards an inner side of the cover cap 84, when the handle part 24 reaches the location of each of the blocking blocks 843, the handle part 24 is downwardly pressed to be latched and fastened, at this moment the front inserting hook 841 abuts against the stopping wall 13, and the rear inserting hook 842 is inserted at the bottom end of the buckling plate 125.

While this disclosure has been described by means of specific embodiments, numerous modifications and variations could be made thereto by those skilled in the art without departing from the scope and spirit of this disclosure set forth in the claims.

What is claimed is:

1. A universal connecting structure for connecting a windshield wiper blade to a windshield wiper arm comprising:

a main body comprising an end cover and a bar-shaped block extended from the end cover, wherein the end cover comprises a pressing plate disposed on one end thereof close to the bar-shaped block and pressing the windshield wiper arm, the bar-shaped block comprises a pivotal groove connected with the windshield wiper blade and a latching block disposed at a location away from the end cover and latched with the windshield wiper arm, a pivotal connecting hole is defined on the bar-shaped block close to the end cover for the windshield wiper arm to pass, an engaging hole is defined on one end of the bar-shaped block away from the end cover, a positioning hook is disposed at a top end of the engaging hole of the bar-shaped block, and a guiding strip and a buckling slot are disposed on two sides of the bar-shaped block;

a supplemental unit coupled with the main body in a replaceable manner, wherein the main body is connected to the windshield wiper arm via the supplemental unit;

wherein the supplemental unit comprises a top plate and a plurality of side plates extended from the top plate, the top plate comprises an accommodation slot, and the latching block protrudes from the accommodation slot;

wherein the top plate further comprises a notch, the notch comprises a positioning slot, the positioning slot is arranged corresponding to the positioning hook to be mutually engaged and positioned with each other, a convex protrusion is extended from an inner side of each of the side plates, each of the convex protrusions is correspondingly buckled and fastened with each of the buckling slots, the bar-shaped block comprises a plurality of latching hooks, each of the side plates comprises a latching plate, and a plurality of the latching plates is correspondingly latched and fastened with the latching hooks.

* * * * *